United States Patent [19]

Peris et al.

[11] Patent Number: 5,796,719
[45] Date of Patent: Aug. 18, 1998

[54] TRAFFIC FLOW REGULATION TO GUARANTEE END-TO-END DELAY IN PACKET SWITCHED NETWORKS

[75] Inventors: Vinod Gerard John Peris, Croton-on-Hudson, N.Y.; Leonidas Georgiadis, Thessaloniki, Greece; Roch Andre Guerin, Yorktown Heights, N.Y.; Subir Varma, San Jose, Calif.

[73] Assignee: International Business Corporation, Armonk, N.Y.

[21] Appl. No.: 659,458

[22] Filed: Jun. 6, 1996

Related U.S. Application Data

[60] Provisional application No. 60/007,196, Nov. 1, 1995.
[51] Int. Cl.⁶ .................................................. H04L 12/56
[52] U.S. Cl. ........................ 370/231; 370/230; 370/232; 370/412; 370/417; 370/418
[58] Field of Search .......................... 370/230, 231, 370/232, 233, 412, 417, 418

[56] References Cited

U.S. PATENT DOCUMENTS 5,289,462  2/1994  Ahmadi et al. ................. 370/60.1
5,347,511  9/1994  Gun ................................. 370/54
5,497,375  3/1996  Hluchyj et al. ................ 370/94.1
5,625,622  4/1997  Johri ............................... 370/232
5,640,389  6/1997  Masaki et al. .................. 370/418

OTHER PUBLICATIONS

Hei Zhang and Domenico Ferrari, Rate-Controlled Service Disciplines, Journal of High Speed Networks 3(4),pp. 389–412, 1994.

*Primary Examiner*—Douglas W. Olms
*Assistant Examiner*—Wilbur T. Baker
*Attorney, Agent, or Firm*—Douglas W. Cameron

[57] ABSTRACT

The present invention relates to the issue of providing end-to-end delay guarantees in a multi-node communication system. More specifically, the present invention addresses the problem of specifying operational parameters of rate-controlled service disciplines in a communication network in order to efficiently provide end-to-end delay guarantees. The key contribution is a method for specifying leaky bucket parameters as well as scheduling delays at each node, which are used as inputs to the rate-controlled service discipline.

5 Claims, 3 Drawing Sheets

TRAFFIC FLOW REGULATION TO GUARANTEE END-TO-END DELAY IN PACKET SWITCHED NETWORKS

CROSS-REFERENCE TO RELATED APPLICATIONS

The present application claims priority to co-pending U.S. provisional application 60/007,196, filed Nov. 1, 1995.

DESCRIPTION

1. Technical field

This invention describes a method and apparatus for regulating the flow of packets through a communication network to efficiently satisfy end-to-end delay guarantees. More specifically, this invention provides a mechanism for specifying the traffic shaper parameters and scheduler delay guarantees at each switch so that the connection's end-to-end delay requirements are satisfied.

2. Description of Prior Art

The problem addressed in this disclosure is that of designing per connection traffic shaping mechanisms at every switch of a packet-switched network in order to efficiently provide per packet end-to-end delay guarantees. Providing end-to-end delay guarantees is an important performance measure of many real-time applications such as video, voice, and remote sensing and process control. Various methods for providing end-to-end delay guarantees exist in the literature.

A frame structure is provided in [2]. Every packet arriving at a switch within one frame, is guaranteed to leave the switch at the next frame and thus the packet delay at that switch is guaranteed to remain below a certain bound that depends on the frame size. By having the frames at all switches synchronized, it is possible to provide overall delay guarantees as the sum of the delay guarantees at each switch. The number of connections that can be accommodated within one frame depends on the peak rate of these connections. Thus, in general, this method leads to inefficient use of the network since it requires that a connection be allocated bandwidth equal to its peak rate.

In [4], the employed service discipline at each switch is a non-preemptive policy that "tracks" the operation of the preemptive Generalized Processor Sharing policy (GPS) with general weights, by scheduling for transmission at the output link, the enqueued packet that would have completed transmission earliest under GPS. This packetized version of GPS is denoted by PGPS. Under the assumption that the input traffic to the network conforms to the output of a "leaky bucket" traffic shaper [5, 6], it is possible to analyze PGPS for fixed weights, and to provide end-to-end delay bounds that are in general much better than the bounds obtained by the simple addition of the worst case bounds at each switch. However, the method of obtaining these bounds is complicated since it requires to take into account the combined effect of all the connections at every switch through which a connection passes. Moreover, the connection admission protocol requires the solution of a inverse problem, namely that of determining the appropriate weights so that specified end-to-end delays guarantees are provided. This implies an even greater complexity for the connection admission protocol under the PGPS service discipline. However, for the specific PGPS policy where the assigned weights are proportional to the connection's maximum sustainable rate (or leaky bucket token generation rate), called Rate Proportional Processor Sharing (RPPS), simpler bounds can be obtained. Relative to the general PGPS policy, RPPS provides a greatly simplified method of obtaining end-to-end delay guarantees, but at the same time its flexibility in providing a wide range of these guarantees is significantly reduced. This is due to the fact that the simpler bounds obtained under RPPS are in general looser than the tight bounds of a POPS policy; moreover, since one has to pick a very specific weight assignment, the choice of possible delay guarantees that can be provided is limited.

A rate-controlled service discipline (RCSD) was first proposed in [7] and in general, it consists of two components. A leaky bucket traffic shaper, which regulates the the rate at which packets are made eligible for transmission on the output link, and a scheduler that arbitrates between the possibly many packets that are eligible for transmission, thus deciding the order of transmission of the eligible packets. A leaky bucket can be implemented by maintaining a counter which is periodically incremented until a certain threshold, that is larger than the maximum packet size. Whenever a packet arrives it is allowed to pass through the leaky bucket if the value of the counter is at least the size of the packet. Otherwise the packet is queued until the counter reaches the packet size. When a packet clears the leaky bucket, the counter is decremented by the size of the packet (See [3] for an example implementation). An example scheduler is the Non Preemptive Earliest Deadline First (NPEDF) scheduler. Here, each connection is associated with a certain delay guarantee. When the packets of a particular connection arrive at the scheduler, they are stamped with a deadline, which is the sum of their arrival time and the associated delay guarantee. Whenever the link is idle, the NPEDF scheduler picks the packet with the smallest deadline for transmission on the output link.

In the RCSD described in [7], the connection traffic at each switch passes first through a traffic shaper and is then delivered to the scheduler at the appropriate output link. The input traffic is assumed to conform to the output of a particular traffic shaper, hereafter referred to as "input traffic shaper". At each switch, the connection is first reshaped by a shaper identical to the input traffic shaper. It is shown that the end-to-end delay under this discipline can be obtained as the sum of the worst case delays at the scheduler at each switch, plus the propagation delay. That is, the shapers do not contribute additional delays to the end-to-end delay bounds. The major advantages of this class of service disciplines are simplicity of implementation, simplified analysis since each switch can be analyzed separately, and modularity since, depending on the processing power of the switch, scheduling policies of varying complexity and efficiency can be chosen. However, the end-to-end delay guarantees can be very loose since they are obtained as a sum of worst case delays at each switch.

A rate-controlled service discipline where the traffic shapers at each switch can reshape the connection's traffic to a shape that has, in general, different parameters than the input traffic shaper, is studied in [1]. It is shown that this modification has the potential to greatly improve the end-to-end delay guarantees and that it can also provide the tight delay guarantees of a PGPS policy. However, no general method for specifying the parameters of the traffic shapers and the scheduler delay guarantees is provided in [1].

References [1–9] are hereby incorporated herein by reference.

In this invention we consider a service discipline of the type described in [1] and provide a mechanism by which the traffic shaper parameters and the scheduler delay guarantees at each switch are specified for a connection during the connection admission phase. In the special case where every connection requires the RPPS delay guarantees, the proposed mechanism can guarantee these delays as well. In addition, the proposed mechanism can provide a much wider range of delay guarantees.

SUMMARY OF THE INVENTION

Consider a packet-switched network which provides strict end-to-end delay guarantees by using a rate-controlled service discipline [7, 1]. The maximum packet length is L. It is assumed that the input traffic shaper of connection n (See 16 of FIG. 2) is of the type specified in the existing ATM [8] and proposed TCP/IP [9] standards. This is equivalent to assuming the following constraints on the connection traffic. Let $I_n[t,t+\tau]$ be the amount of connection n traffic that enters the network in the interval $[t,t+T]$. Then, for all t, $\tau \geq 0$, $$I_n[t,t+\tau] \leq \bar{I}_n(\tau) = L + \min \{c_n \tau, \sigma_n + \rho_n \tau\},$$

where $c_n$, $\sigma_n$, $\rho_n$, are referred to as the connection peak rate, burstiness and sustainable rate respectively. These parameters are negotiated with the network during the connection establishment process and are referred to as pre-determined traffic characteristics. These characteristics basically specify the input shaper envelope $\bar{I}_n(\tau)$. Also, during the negotiation process, an upper bound on the end-to-end packet delay for connection n traffic, $\bar{D}_n$, is requested from the network. That is, $\bar{D}_n$ is the requested end-to-end delay guarantee.

The operation of a rate-controlled service discipline that will guarantee an upper bound $\bar{D}_n$ on the end-to-end packet delay for connection n traffic, requires the following specifications at each switch m (switching node m) along the path of the connection (See FIG. 1):

The parameter values for a traffic shaper 10 (leaky bucket) $L_n^m$ which reshapes the traffic of connection n at switch m, to conform to an envelope $L + \min\{c_n^m \tau, \sigma_n^m + \rho_n^m \tau\}$.

Upper bounds on the scheduler delays at each of the output links of the switch. Given the leaky bucket parameters of all connections that are destined for output link 1 of switch m, the scheduling policy that arbitrates packet transmission on the link, guarantees an upper bound $D_n^m$ for the scheduling delays (queueing in the scheduler 15 plus transmission time of a packet) of connection n packets.

It is known [1] that for any connection, it is optimal to have identical leaky bucket parameters at each switch along the path, but not necessarily identical to the parameters of the input traffic shaper. More specifically, we have that for each switch, m, along the path of the connection n, $$\rho_n^m = \rho_n, c_n^m = \bar{c}_n, \sigma_n^m = \sigma_n \frac{1 - \rho_n/\bar{c}_n}{1 - \rho_n/c_n} = \bar{\sigma}_n.$$

It is also known [1] that the optimal value of $\bar{c}_n$ is in the range $[\rho_n, \min_m \{r_m^n, c_n\}]$, where $r_m^n$ denotes the link capacity of the output link at node m to which the connection n traffic is routed. The previous specification still leaves the parameters $\bar{c}_n$ (peak leaky bucket rate) and $D_n^m$ (scheduler delay) undefined. As shown in [1], these parameters are crucial for the efficient operation of the service discipline. The objective of this invention is to provide a method for determining $\bar{c}_n$ and $D_n^m$. First, however, we need to provide an expression for the end-to-end delay bound of a rate-controlled service discipline. Referring to FIG. 2, let connection n traverse switches 1, . . . , M, and let $T_n^m$ be the propagation delay between switches m and m+1. By convention, switch M+1 (not shown in FIG. 2) is the destination of connection n. Let $L_n^m$ be a bound on the delay the connection n traffic experiences in the traffic shaper of switch m (See FIG. 2). It can then be shown (See [1]), that the end-to-end delay, i.e., the delay a packet experiences from the time it exits the input traffic shaper (See 16 of FIG. 2) to the time it arrives at its destination, is bounded by $$D_n = \begin{cases} L_n^1 + \sum_{m=1}^{M} (D_n^m + T_n^m), & \text{if } c_n > \rho_n \\ \sum_{m=1}^{M} (D_n^m + T_n^m), & \text{if } c_n = \rho_n \end{cases} \quad (1)$$

where $$L_n^1 = \frac{\sigma_n}{c_n - \rho_n} \left( \frac{c_n}{\bar{c}_n} - 1 \right),$$

Note that the bound on the delay includes only the shaper delays at the first switch ($L_n^1$). This shaper delay at the first switch is referred to as the "access delay bound". That is, the shaper delays, $L_n^2, L_n^3, \ldots, L_n^M$ are not included. The intuitive explanation for not including the shaper delays at the rest of the switches, is that only packets that were transmitted early by the scheduler at a switch, can be delayed by the shaper at the next switch. It is important to note that the upper bound on the scheduler delay at switch m, $D_n^m$, depends on the leaky bucket parameters and on the delay bounds of all the connections whose traffic is routed to the same output link at node m as the connection n traffic.

The method proposed in this invention determines $\bar{c}_n$, based on the following principle.

Make the peak rate $\bar{c}_n$ as small as possible as long as it can be guaranteed that $\bar{D}_n \geq D_n$.

The rationale for picking $\bar{c}_n$ as small as possible, is that this choice smoothes the traffic inside the network as much as possible and therefore will result in smaller buffer requirements at the switches.

Once the parameter $\bar{c}_n$ is determined, the upper bound on the delay at the scheduler, $D_n^m$, that switch m can provide to connection n has also been determined (See description of 32 of FIG. 3 below). The end-to-end delay $D_n$, can then be computed according to formula (1). It may, however, happen that we still have $\bar{D}_n > D_n$. In which case, it remains to determine how the delay slack, $\bar{D}_n - D_n$, is to be reallocated to the switches along the path of the connection. This reallocation is of importance as it allows us to relax the delay bounds of the connection at the switches, so that more future connection requests can be accepted. In this disclosure, we also describe a method to perform this reallocation. The method reflects the following objective Allocate the delay slack to the M switches that connection n traverses, so that the minimum delay bound over all the nodes is maximized.

The rationale for this objective is that it tends to equalize the allocated delay guarantees at all nodes, which in turn implies that the scheduler buffering requirements of the connection are spread more evenly among the switches.

DESCRIPTION OF PREFERRED EMBODIMENT

In this section we describe an implementation of the computations outlined in the previous section, to determine the appropriate peak leaky bucket rate, $\bar{c}_n$, of a new connection n with given end-to-end delay requirements, $\bar{D}_n$, as well as the upper bound on the scheduler delay, $D_m^n$, to be assigned at each node m on the connection's path. The inputs to the computations are the predetermined traffic characteristics of the connection $L_n=(c_n, \sigma_n, \rho_n)$, its desired end-to-end delay bound $\bar{D}_n$, and the path (set of nodes and links) over which the connection is to be routed. The implementation relies on the use of standard programming methods using high level programming languages such as C or C++ and a general purpose processor.

Figure 1:
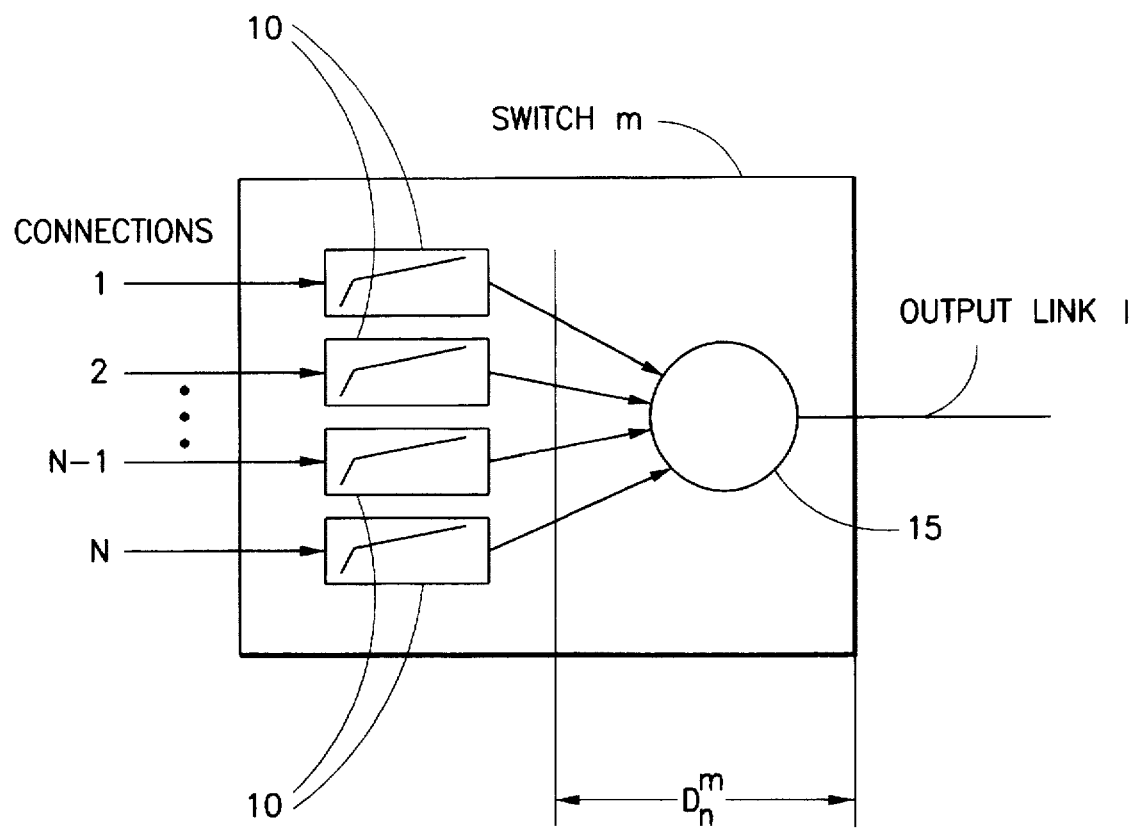
FIG. 1 is an illustration of the switching node m with the output link 1 on to which connections 1, . . . , N are multiplexed. Packets from each connection are first regulated by leaky buckets 10, to ensure that the resulting output is conformant with the leaky bucket characteristics. Scheduler 15 controls the order in which packets that have cleared their respective leaky buckets are transmitted on the output link 1.
Figure 2:
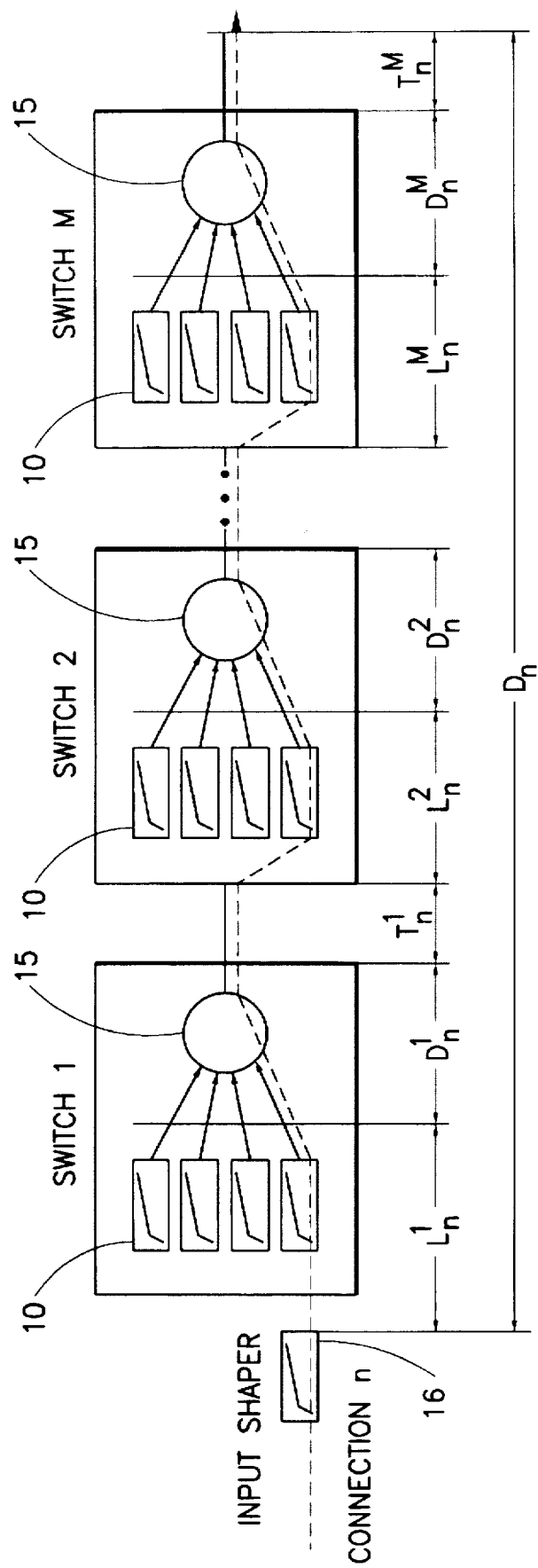
FIG. 2 graphically illustrates the path of the connection through a number of switches or switching nodes. It also illustrates the access delay bound, $L_n^1$, as well as the scheduler delay bounds, $D_n^m$. The propagation delay along the link from switch 1 to switch 2 is indicated by $T_n^1$.
Figure 3:
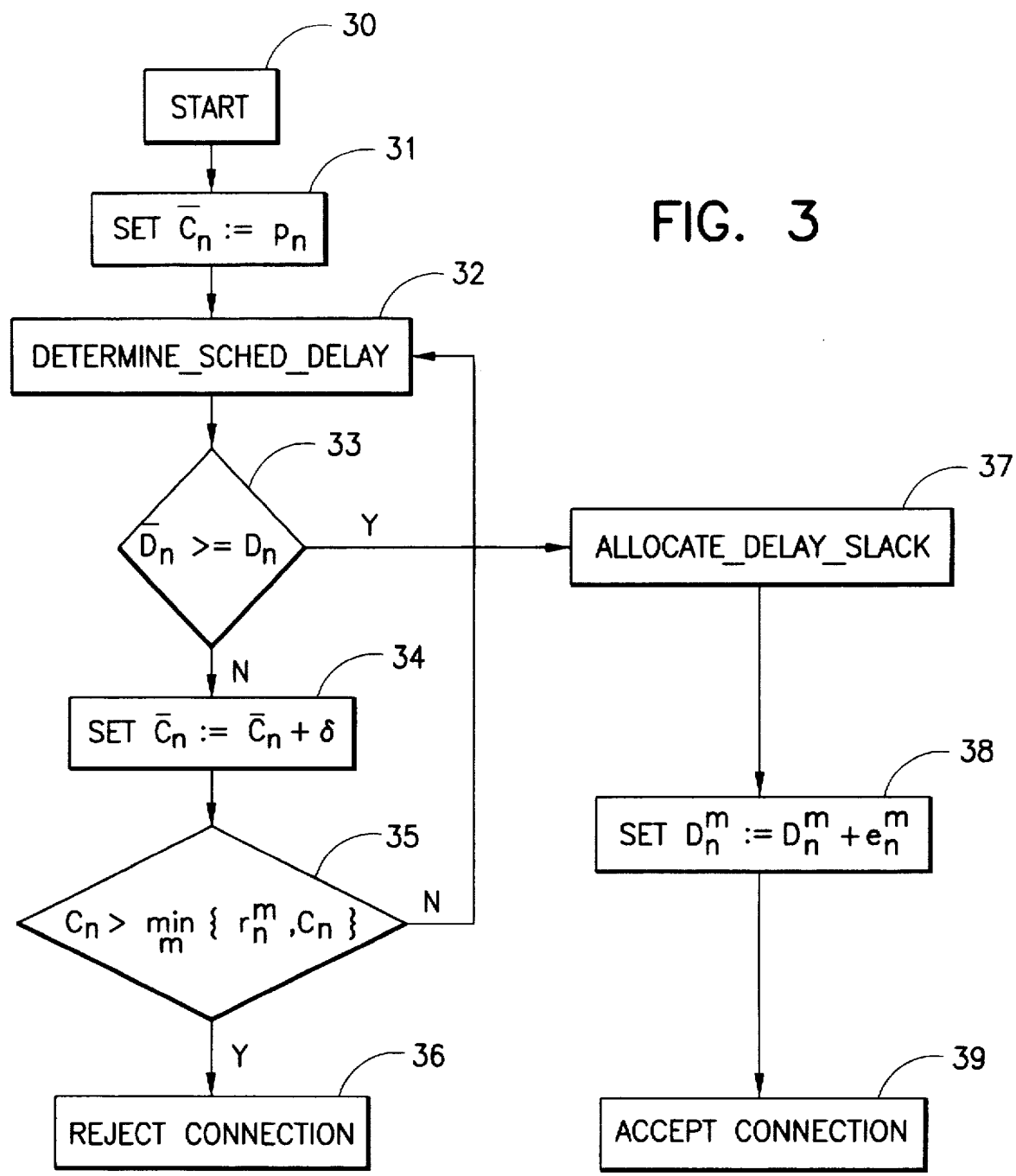
FIG. 3 is a flowchart illustrating the calculation of the peak rate and the upper bounds on the scheduler delays that can be used at each of the switching nodes.

A flow-chart illustrating the different phases of the computations is shown in FIG. 3, which displays the iterative process used to determine the optimal value for $\bar{c}_n$. For the sake of clarity we describe the algorithms in this invention, in the framework of a centralized controller that controls each switch in the network. Such a controller can be implemented using any general purpose processor. Alternatively, the implementation may be distributed among the switches along the path of the connection with each switch only aware of the connections that are routed through it. Iterations of the process would then take place across the switches instead of at the centralized controller.

We first describe a simple component/subroutine that, as shown in FIG. 3, is used repeatedly in the determination of $\bar{c}_n$. Consider a link l at node m along the path through which connection n is routed. Assume that a value $\bar{c}_n$ has been tentatively selected for the peak rate of connection n, so that its characteristics at the output of the shaper at switch m (and at all other switches on the path) are now given by the triplet $L_n=(\bar{c}_n, \rho_n, \bar{\sigma}_n)$. Node m already has a set $C_{l,m}$ of connections established on link l, each with already determined characteristics $L_k^m=(\bar{c}_k^m, \rho_k^m, \bar{\sigma}_k^m)$ and associated delay bounds $D_m^k$, for all $k \in C_{l,m}$. The quantities $L_m^k$, $D_k^m$, $k \in C_{l,m}$ are stored in an array form at the centralized controller, or at node m in the case of a distributed implementation. Similarly, the propagation delay on the link from switch m to m+1, denoted by $T_n^m$ is stored as part of the link attributes of the switch m, and is independent of the connection characteristics. All quantities are preferably represented using a floating point representation for greater precision, but a fixed-point representation can also be used if required.

Given tentative characteristics $(\bar{c}_n, \rho_n, \bar{\sigma}_n)$ for connection n and the knowledge of the quantities $L_k^m$, $D_k^m$, for all connections $k \in C_{l,m}$ already established on link l at node m, a key component in determining the final values for the network leaky bucket parameters, is to compute the minimum delay that can be guaranteed to connection n on link l of node m. This computation has to be carried out at each node m on the path, and is performed by the subroutine Determine_Sched_Delay $(\bar{c}_n, \bar{\sigma}_n, \rho_n, \{L_k^m, D_k^m, k \in C_{l,m}\})$ (See 32.)

The implementation of this subroutine depends on the scheduling policy employed at the switch, and can be performed using standard operations available in any high level programming languages. An example of such a computation can be found in [1] for the case where the scheduler is an Earliest-Deadline-First (EDF) scheduler.

We are now ready to proceed with the description of the implementation, outlined in FIG. 3, of the algorithm used to determine the appropriate value of $\bar{c}_n$ as well as the upper bound on the scheduler delay, $D_n^m$ at each node m on the path of connection n. The first step 31 of the algorithm is to select initial values for the network leaky buckets which in this case are determined by a single value $\bar{c}_n$ by setting $$\bar{c}_n = \rho_n, \bar{\sigma}_n = \sigma_n \frac{(1-\rho_n/c_n)}{(1-\rho_n/c_n)},$$

and determining if this results in a feasible end-to-end delay guarantee. The choice for such a starting point is that, as mentioned in the previous section, we are trying to minimize $\bar{c}_n$, and if the smallest possible value is feasible, the algorithm stops right after this first step.

In order to determine if $\bar{c}_n = \rho_n$ is feasible, we need to compute an upper bound on the scheduler delay, $D_n^m$, that can be guaranteed under this setting at each node m on the connection's path. The value $D_n^m$ at each node m on the path of the connection n, is computed by applying the subroutine Determine_Sched_Delay $(\rho_n, 0, \rho_n, \{L_k^m, D_k^m, k \in C_{l,m}\})$, where we have set $\bar{c}_n:=\rho_n$ and $\bar{\sigma}_n:=0$. Once the scheduler delay bounds $D_n^m$ have been computed for each node on the path, the next step is to determine the associated end-to-end delay bound $D_n$ from equation (1). Recall, that in addition to the sum of the scheduler delay bounds, the end-to-end delay bound, $D_n$, includes the access delay bound ($L_n^1$), incurred at the shaper in the first switch, as well as the sum of the propagation delays ($T_n^m$) that are incurred at each of the links along the path. Two cases must then be distinguished depending on the value of $D_n$.

1. $\bar{D}_n \geq D_n$: (See 33.) In this case, the algorithm to determine $\bar{c}_n$ completes after this first step, and the required end-to-end delay bound can be achieved by setting $\bar{c}_n:=\rho_n$, i.e., after reshaping the traffic with a leaky bucket of type $(\rho_n, 0, \rho_n)$.

Since the desired peak rate of the connection is now known, the allocation of any residual "delay slack" $d_n = \bar{D}_n - D_n$ among the M nodes can now be performed. This amounts to increasing the scheduling delay $D_n^M$ at node m by a quantity $e_n^m$, such that $\Sigma_{i=1}^m e_n^m = d_n$. This delay slack allocation is performed by the subroutine Allocate_Delay_Slack $(d_n, \{D_n^m, e_n^m, m=1, \ldots, M\})$, (See 37.)

which can be seen in FIG. 3 and will be detailed later. Note that this subroutine again relies on standard computational procedures which can be implemented using any high level programming language.

The last step is to set $D_n^m:=D_n^m+e_n^m$ (See 38.) and the connection is accepted 39.

2. $\bar{D}_n < D_n$: In this case the end-to-end delay bound cannot be met with $\bar{c}_n = \rho_n$, and it is necessary to consider larger peak rate values. The algorithm then searches for the smallest possible value larger than $\rho_n$ such that the resulting end-to-end delay bound verifies $\bar{D}_n \geq D_n$.

This is achieved by means of a standard iterative process (the loop on the left-hand-side of FIG. 3), for which a pseudocode description is provided below. In each iteration the value of $\bar{c}_n$ is incremented by a fixed quantity $\delta$, i.e., we set $\bar{c}_n := \bar{c}_n + \delta$, where $\delta = (\min_m\{r_n^m, c_n\} - \rho_n)/\Delta$, and the parameter $\Delta$ determines the accuracy of the solution (See 34.). For each new value of $\bar{c}_n$, a check is made to test if the delay bound is met. i.e., if $\bar{D}_n \geq D_n$. The algorithm stops at the first peak rate value $\bar{c}_n$ for which this condition is true. As mentioned earlier, this is consistent with the principle of selecting the lowest possible peak rate. Once a feasible value has been identified for $\bar{c}_n$, the remaining delay slack is allocated to the different nodes so that the final local delay bounds $D_n^m$ are determined. This computation (right-hand-side of FIG. 3) is again carried out based on the subroutine Allocate_Delay_Slack ( ), whose pseudocode implementation is also provided below. Finally, if the algorithm reaches $\bar{c}_n = \min_m\{r_n^m, c_n\}$ and we still have $D_n > \bar{D}_n$ (See 35.), the connection is rejected as it cannot be admitted in the network (See 36.), at least not with the requested delay guarantees.

Next we provide a pseudocode description of the above algorithm.

Algorithm for Determining $\bar{c}_n$ and Upper Bounds on Scheduler Delays

1. $\bar{c}_n := \rho_n$; $\delta := (\min_m\{r_n^m, c_n\} - \rho_n)/\Delta$ 2. while $(\bar{c}_n \leq \min_m\{r_n^m, c_n\})$ (a) for ($m := 1$ to $M$)

i. $D_n^m :=$ Determine_Sched_Delay $(\bar{c}_n, \bar{\sigma}_n, \rho_n, \{\mathcal{L}_k^m, D_k^m, k \in C_{l,m}\})$ (b) if $(c_n > \rho_n)$ i. $D_n := \sigma_n(c_n - \bar{c}_n)/((c_n - \rho_n)\bar{c}_n) + \sum_{m=1}^{M}(D_n^m + T_n^m)$ (c) else $D_n := \sum_{m=1}^{M}(D_n^m + T_n^m)$ (d) if $(\bar{D}_n \geq D_n)$ i. $d_n := \bar{D}_n - D_n$ ii. Allocate_Delay_Slack $(d_n, \{D_n^m, e_n^m, m = 1, \ldots, M\})$ iii. $D_n^m := D_n^m + e_n^m$ iv. output $\bar{c}_n, \{D_n^m, m = 1, \ldots, M\}$; stop.

(e) else $\bar{c}_n := \bar{c}_n + \delta$ 3. reject connection; stop.

The above pseudocode implements a standard sequential search in the range of values that $\bar{c}_n$ can take. It may be possible to devise methods other than a sequential search that are more efficient. This would, however, require knowledge of the relation between $D_n^m$ and $\bar{c}_n$, which in turn depends on the specific scheduling policy used. As was mentioned before, this is also the case for the subroutine Determine_Sched_Delay ( ) as the minimum possible delay obviously depends on the selected scheduling policy. The algorithm whose pseudocode is provided here applies irrespective of the policy chosen.

Step 2. (d) in the above pseudocode allows us to determine the local delay bounds at all the switches on the path of the connection, once the smallest possible value for $\bar{c}_n$ has been identified. The local delay bounds are obtained from the minimum delays $D_n^m$ obtained for that value of $\bar{c}_n$, to which a fraction of the residual delay slack $d_n$ is added. This requires that we specify the sub-routine Allocate_Delay_Slack $(d_n, \{D_n^m, e_n^m, m=1, \ldots, M\})$.

As mentioned in the Summary of the Invention Section, the goal of this subroutine is to allocate the delay slack $d_n$ to the M switches traversed by connection n, so that the minimum delay over all the nodes is maximized. In other words, the most stringent delay requirement is maximized.

The formulation of the corresponding optimization problem is as follows:

$$\max_{e_n^m} \left\{ \min_{1 \leq m \leq M} (D_n^m + e_n^m): e_n^m \geq 0, \sum_{m=1}^{M} e_n^m = d_n \right\}.$$

A solution to this problem is obtained as follows. First, an attempt is made to allocate the delay slack among the switches so as to yield equal delay bounds at all switches. This may, however, not be possible since it may actually require the lowering of some delay bounds, say at switch m, below the computed minimal value $D_n^m$. This actually means that these switches should not consume any of the available delay slack since their local bound is already higher than that at other switches. Switches that fall in this category are identified by the fact that they receive a negative delay slack allocation when trying to equalize all switch delays. When any such switch is present, the one with the largest $D_n^m$ is removed from the computation, and another attempt is made at equalizing the delay bounds at the remaining switches. The process is repeated until a feasible allocation (no negative value) is achieved.

The subroutine Allocate_Delay_Slack ( ) implements the above procedure and its pseudocode representation is as follows.

subroutine Allocate_Delay_Slack$(d_n, \{D_n^m, e_n^m, m = 1, \ldots, M\})$

1. Sort $D_n^m$; Let $D_n^{m_1} \geq D_n^{m_2} \geq \ldots \geq D_n^{m_M}$.

2. for ($K = 1$ to $M$)

(a) $c := \left( \sum_{i=K}^{M} D_n^{m_i} + d_n \right)/(M - K + 1)$ (b) if $(c \geq D_n^{m_K})$ i. $e_n^{m_i} := c - D_n^{m_i}, K \leq i \leq M$, return (c) else i. $e_n^{m_K} := 0$ The above subroutine can be easily modified to solve a slightly different optimization problem, where the equalization is performed not on the delay bounds, but instead only on their component due to queueing delays. In general, the delay bound of connection n at node m is of the form $D_n^m = L/r_n^m + q_n^m$, $q_n^m \geq 0$, where $L/r_n^m$ represents the transmission delay of a maximum length (L) packet, while $q_n^m$ corresponds to the scheduler queueing delay. It may be desirable to equalize as much as possible the buffering requirements due to queueing rather than total delays at the M switches that connection n traverses. This can be achieved through a simple modification of the above subroutine where we simply replace $D_n^m$ with $q_n^m$, i.e., we have Allocate_Delay_Slack $(d_n, \{q_n^m, e_n^m, m=1, \ldots, M\})$.

Example of Application of the Algorithm to Achieve RPPS Delay Bounds

Last, we illustrate how the general algorithm described in this disclosure can be used to provide, as a special case, delay allocations and bounds equal to those of the RPPS policy. Assume now that the input traffic for connection n satisfies $I_n|t,t+\tau|\geq \bar{l}(r)=L+\sigma_n+\rho_n\tau,$ and that the RPPS delay guarantees are required by all the connections in the network, i.e., for connection n it is required that $$\bar{D}_n = \frac{\sigma_n + L + 2(M-1)L}{\rho_n} + \sum_{m=1}^{M}\left(\frac{L}{r_n^m} + T_n^m\right).$$

If the scheduling policy employed by each node is Non-preemptive Earliest Deadline First, (NPEDF), and we invoke the subroutine Allocate_Delay_Slack $(d_n, \{q_n^m, e_n^m, m=1, \ldots, M\})$, then using the techniques in [1] it can be shown that the resulting traffic reshaping parameters result in a rate-controlled service policy that guarantees the RPPS bounds.

REFERENCES

[1] L. Georgiadis, R. Guérin, V. Peris, and K. N. Sivarajan. Efficient Network QoS Provisioning Based on Per Node Traffic Shaping. Research Report RC 20064, IBM, T. J. Watson Research Center, May 1995.

[2] S. Jamal Golestani. A Framing Strategy for Congestion Management. *IEEE Journal of Selected Areas in Communication*, 9(7):1064–1077, September 1991.

[3] R. Guérin, A. K. Parekh, P. Chang and J. T. Rayfield. A Method and System for Implementing Multiple Leaky Bucket Checkers Using a Hybrid Synchronous/Asynchronous Update Mechanism. U.S. patent Ser. No. 08/382,464 filed Feb. 1, 1995, assigned to the same assignee of the current application. IBM Docket YO994-224.

[4] A. K. Parekh and R. G. Gallager. A Generalized Processor Sharing Approach to Flow Control in Integrated Services Networks: The Multiple Node Case. *IEEE/ACM Transactions on Networking*, 2(2):137–150, April 1994.

[5] M. Sidi, W. Z. Liu, I. Cidon, and I. Gopal. Congestion Control Through Input Rate Regulation. In Proceedings of the *IEEE GLOBECOM '89*, pages 1764–1768, 1989.

[6] Jonathan S. Turner. New Directions in Communications (or which way to the Information Age?). *IEEE Communications Magazine*, 24(10):8–15, October 1986.

[7] Hui Zhang and Domenico Ferrari. Rate-Controlled Service Disciplines. *Journal of High Speed Networks*, 3(4):389–412, 1994.

[8] ATM (Asynchronous Transfer Mode) User Network Interface Specification, Version 3.1, ATM Forum, September 1994.

[9] C. Partridge. A Proposed Flow Specification. Internet Network Working Group, Request for Comments: 1363, September 1992.

Having thus described our invention, what we claim as new and desire to secure by Letters Patents is:

1. In a communications network having a plurality of packet switching nodes and providing a requested end-to-end delay guarantee to a sequence of packets of a connection having pre-determined traffic characteristics, each of said nodes having a leaky bucket and scheduler to regulate the flow of said packets therethrough, said network thus having a plurality of leaky buckets and schedulers, a method of transmitting said packets of said connection through a path of said network, said method comprising:

(a) setting initial values for parameters of said leaky buckets of said nodes of said path based upon said pre-determined traffic characteristics of said connection;

(b) determining an access delay bound for said packets of said connection from said pre-determined traffic characteristics of said connection and said values for said parameters;

(c) determining upper bounds on the scheduler delays that would be experienced by said packets of said connection at those of said nodes of said path based upon said values for said parameters;

(d) updating said values for said parameters if the sum of said access delay bound and said upper bound on scheduler delays as well as the propagation delays for all of said nodes on said path is outside a fixed interval;

(e) repeating steps (b) through (d) with said updated values for said parameters determined in step (d), instead of with said initial values, until said sum is within said interval; and (f) transmitting said packets of said connection through said path, where the flow of said packets will be regulated at each of said nodes by a corresponding one of said leaky buckets and a corresponding one of said schedulers, where said updated values for said parameters for said leaky buckets are set in accordance with said updated values for said parameters determined in step (e), so as to ensure that each of said packets of said connection will be transmitted through said path within said end-to-end delay guarantee.

2. A method as recited in claim 1, wherein said updates in step (d) are performed by incrementing said values for said parameters, and said fixed interval is from 0 to said end-to-end delay guarantee requested by the connection.

3. A method as recited in claim 1, further comprising:
increasing said upper bound on said scheduler delays at each of said nodes on said path, if said sum, determined from last repetition of step (e) is less than the end-to-end delay guarantee requested by the connection, so that said sum becomes equal to said requested end-to-end delay guarantee.

4. A method as recited in claim 1, wherein said initial values of said parameters are set so that the peak rate parameter of said network leaky buckets at each of said nodes on said path equals the sustainable rate of the said connection.

5. In a communications network having a plurality of packet switching nodes and providing a requested end-to-end delay guarantee to a sequence of packets of a connection having pre-determined traffic characteristics, each of said nodes having a leaky bucket and scheduler to regulate the flow of said packets therethrough, said network thus having a plurality of leaky buckets and schedulers, an apparatus for transmitting said packets of said connection through a path of said network, said apparatus comprising:

(a) means for setting initial values for parameters of said leaky buckets of said nodes of said path based upon said pre-determined traffic characteristics of said connection;

(b) means for determining an access delay bound for said packets of said connection from said pre-determined traffic characteristics of said connection and said values for said parameters;

(c) means for determining a bound on scheduler delays that would be experienced by said packets of said connection at those of said nodes of said path based upon said values for said parameters;

(d) means for updating said values for said parameters if the sum of said access delay bound and said upper bound on scheduler delays as well as propagation delays for all of said nodes of said path is outside a fixed interval;

(e) means for repeating steps (b) through (d) with said updated values for said parameters determined in step (d), instead of with said initial values until said sum is within said interval; and (f) means for transmitting said packets of said connection through said path, where the flow of latter said packets will be regulated at each of said nodes by a corresponding one of said leaky buckets and a corresponding one of said schedulers, where said updated values for said parameters for said leaky buckets are set in accordance with said updated values for said parameters determined in step (e), so as to ensure that each of said packets of said connection will be transmitted through said path within said end-to-end delay guarantee.

* * * * *